United States Patent [19]

Tóth et al.

[11] Patent Number: 4,676,918

[45] Date of Patent: Jun. 30, 1987

[54] ANTI-FREEZE COMPOSITION SUITABLE FOR MAKING SURFACES FREE OF SNOW AND ICE

[75] Inventors: Jenö Tóth; Jozsef Szeles; Otto Egenhoffer, all of Budapest, Hungary

[73] Assignee: Alkoto Ifjusag Egyesules, Budapest, Hungary

[21] Appl. No.: 823,327

[22] Filed: Jan. 28, 1986

[51] Int. Cl.$^4$ ................................................ C09K 3/18
[52] U.S. Cl. ........................................ 252/70; 106/13
[58] Field of Search ............................ 252/70; 106/13

[56] References Cited

U.S. PATENT DOCUMENTS 2,410,910 11/1946 Wait ....................................... 252/70
3,412,030 11/1968 Wahlberg .............................. 252/70
3,712,802 1/1973 Grybek et al. ........................ 252/70

FOREIGN PATENT DOCUMENTS 2516956 5/1983 France ................................... 252/70
652138 3/1979 U.S.S.R. ............................... 106/13

Primary Examiner—Robert A. Wax
Attorney, Agent, or Firm—Keil & Weinkauf

[57] ABSTRACT

The invention relates to an anti-freeze composition and preparation for making surfaces free of snow and ice, comprising in an amount of 20 to 90% by weight a waste concentrate of alcohol distilling industry, having a dry-substance content of 200 to 750 g/kg, in admixture with 10 to 80% by weight of water and optionally with additives.

The composition is neither detrimental to environment nor does it exhibit any corrosive effect, and it can be used under optional weather conditions. It uniformly cools the surface to be melted and preserves the road surface.

12 Claims, No Drawings

ANTI-FREEZE COMPOSITION SUITABLE FOR MAKING SURFACES FREE OF SNOW AND ICE

This invention relates to an anti-freeze composition suitable for making surfaces free of snow and ice and to a method for making road surfaces free of snow and ice.

It is known that in the development of public traffic the road system and network generally constitute a bottle-neck and in winter season the perviousness of roads is further reduced; this fact causes jams and block in rush-hour traffic and involves risks of accidents. For this reason, in the winter cleaning of roads, in addition to mechanical removal of snow, chemical methods are used, too. As chemical agents particularly chloride salts are used, in the first place sodium, magnesium and calcium chloride. These chloride salts are used either per se in solid form or in solution or in admixture with sand or other granular substances. These materials are very strongly detrimental to the environment, particularly for the following reasons:

they cause damages to the soil, deteriorate the physical properties thereof and make the soil alkaline;
they damage the surface waters as a result of the increase of the salt concentration;
they damage the vegetation particularly because the salts get in contact with the plants and are absorbed via the root-system and as a result of these effects the grass and trees may be completely exterminated along the public roads.

The salts applied onto the roads in order to melt the snow and ice cause huge damages all over the world to vehicles, concrete coating, steel concrete constructive works and metallic objects placed in the soil (e.g. gas pipeline) as a result of the corrosive effect.

In technical literature a large number of articles and publications deals with the problems of making roads free of snow and ice. These publications relate also to the mechanical aspects of this problem and various equipments are discussed in detail. It is further suggested to replace calcium chloride, magnesium chloride and sodium chloride by ammonium sulfate, ammonium nitrate, ammonium chloride and urea. However, from these substances only urea is not detrimental to environment but it is a very expensive material. According to further methods alcohols and glycols are used as anti-freeze agents. Although these substances are not corrosive, they are very expensive, certain alcohols and glycols are inflammable and when getting into sewage-water they need a high amount of oxygen for their biological decomposition.

According to the British patent specification No. 1,463,401 an anti-freeze composition consisting of the following four components is disclosed:
(1) an alkali metal, alkaline earth metal or ammonium nitrate or chloride;
(2) benzoate, sodium bichromate, sodium tripolyphosphate, sodium hexametaphosphate, sodium hydrogen phosphate, sodium ferrocyanide or zinc sulfate;
(3) glycine and
(4) an alkali metal nitrite.

According to the U.S. Pat. No. 4,153,473 calcium nitrite is used for making roads and bridges free of snow and ice.

In the DOS No. 2,364,491 a composition comprising a film-forming component (e.g. the distillation residue of natural fatty acids) and a hydrophobic solvent component is described, the said composition being usable against icing and adhesion and being applicable by spraying at temperatures not lower than $-25°$ C.

The replacement of chemical substances used against slipperiness by materials not causing any environmental pollution has not been solved so far. This is mainly due to the manyfold requirements the said materials must comply with. The following requirements are of primary importance: suitable water solubility; cheap availability on industrial scale; minimal risks of corrosion and environmental pollution; applicability by means of known and generally used equipments etc. On the other hand, the known materials and methods are accompanied by the common drawback that they comprise components causing environmental pollution and often exhibiting carcinogenic effect and for this reason the known substances and procedures do not comply with modern specifications for the protection of environment and hence can not be used on public roads.

It is the object of the present invention to overcome the drawbacks of the known solutions and to provide an anti-freeze composition suitable for making surfaces free of snow and ice which fully meet the above requirements, namely it is water-soluble, cheaply and readily available in large quantities, is not corrosive and does not cause environmental pollution.

The invention is based on the recognition that the distillation residue (the so-called waste concentrate) obtained on the distillation of the so-called malt swill being formed in large quantities as distillation residue in the course of industrial-scale alcohol manufacturing procedure starting from carbohydrate-containing raw materials, is an anti-freeze agent of outstanding properties; the said "waste concentrate" is entirely neutral, exhibits anti-corrosive effect, moreover it antagonizes the corrosive effect of simultaneously used solid salts or solid mixtures of salt and sand and additionally, due to its protein content, it exerts even an anti-slip and adhesion-increasing effect.

According to the present invention there is provided an anti-freeze composition for making surfaces free of snow and ice, comprising in an amount of 20 to 90% by weight a waste concentrate of alcohol distilling industry, having a dry-substance content of 200 to 750 g/kg, in admixture with 10 to 80% by weight of water and optionally with additives.

According to a preferable aspect of the present invention the anti-freeze composition comprises waste concentrate obtained in the course of distilling alcohol manufacture starting from molasses.

As additive e.g. the following substances may be used: sodium chloride, calcium chloride, potassium chloride, magnesium chloride, urea, sand, river-gravel, cinders and/or sawdusts or surfactants having a HLB-value between 6 and 12, particularly between 8 and 10 (HLB=hydrophilic-lypophilic balance).

The compositions of the present invention are excellently suitable as anti-freeze agent and for making roads, bridges or other surfaces free of snow and ice.

According to a further aspect of the present invention there is provided a process for making road surfaces free of snow and ice, which comprises applying the composition of the present invention onto the said road surface. The composition may be preferably applied onto the road surface from moving vehicles in an amount of 0.05 to 0.4 l/m$^2$.

The waste concentrate of alcohol distilling industry used as active substance in the composition of the present invention is the by-product of molasses-based alcohol manufacturing procedure. In the course of alcohol manufacturing the yeast (*Saccharomyces cerevisiae*) added to carbohydrate-containing raw materials converts the carbohydrate content thereof to alcohol in a fermentation procedure. As a result of fermentation a mash comprising 8 to 10% by weight of alcohol, 1.1 to 1.3% by weight of yeast and 0.1 to 0.3% by weight of residual carbohydrate is obtained. The yeast is separated and the mash free of yeast thus obtained is distilled off. Then the crude alcohol thus obtained is subjected to rectification. After distillation a molasses swill having a dry substance content of 8 to 11% by weight is obtained; this product contains all the nutritive materials originally present in molasses, with the exception of sugar, and also the organic substances formed during fermentation beside the alcohol. The diluted molasses swill is evaporated in vacuo and the concentrated swill thus obtained is put on the market under the commercial name VINASZ. The composition of the said product may vary between the following ranges:

| dry substance | 400–700 g/kg |
|---|---|
| organic substance | 400–600 g/kg |
| crude protein | 100–250 g/kg |
| ash | 100–250 g/kg |
| Ca | 8–15 g/kg |
| Na | 15–30 g/kg |
| K | 60–80 g/kg |
| Mg | 1–3 g/kg |
| Cu, P, S, Fe, Mn, Zn | below 5 g/kg |

The main advantages of the composition according to the present invention may be summarized as follows:

(a) It is not detrimental to the environment.

(b) When admixed with an equal volume of water it is liquid at a temperature of $-24°$ C. and thus can be applied onto the surface to be treated in the form of a spray.

(c) When applied onto the road surface it fixes and immobilizes the solid materials applied onto the road before freezing and for this reason the said agents can not be swept away by wind or the air current of vehicle traffic. Thus the required amount of solid substances per unit of road surface is decreased.

(d) It can be used under optional weather conditions and can be readily and exactly applied in the desired concentration.

(e) It is uniformly distributed on the treated surface.

(f) Getting inside from the surface it gradually melts snow and ice, the surface of the coating is uniformly cooled and the temperature deviations in vertical and horizontal directions are smaller than in the case of known antifreeze compositions. For this reason the liquid water still present in the capillary tubes of the non-frozen concrete layer is not abruptly cooled and the "peeling" deterioration of the road occurring on the use of the known compositions due to the jerky and abrupt heat extraction may be avoided.

(g) The composition of the present invention is not corrosive, this being a significant advantage over known compositions which cause very serious damages to the metallic parts of the vehicles and to the road surface because of the corrosive effect thereof.

(h) The composition may be applied in the form of a solution and for this reason the spraying vehicle can treat in one course a larger area or a longer road-section and the speed is also considerably higher (it can reach the value of 50 km/h).

(i) The composition can be stored in optional vessels.

Further details of the present invention are to be found in the following Examples without limiting the scope of protection to these Examples.

The waste concentrate of alcohol distilling industry used in the Examples is of the following composition:

| dry substance | 700 g/kg |
|---|---|
| organic substance | 600 g/kg |
| ash | 100 g/kg |
| Ca | 10 g/kg |
| Na | 20 g/kg |
| K | 80 g/kg |
| S | 3 g/kg |
| Fe | 300 mg/kg |
| P | 1 g/kg |
| Mn | 30 mg/kg |
| Zn | 20 mg/kg |

EXAMPLE 1

In the place of calcium chloride hitherto used 1.5 tons (34% by weight) of sodium chloride rock-salt pre-sieved on a 5 mm sieve, 1.5 tons (34% by weight) of pre-sieved river-gravel, 1 ton (23% by weight) of waste concentrate (dry substance content 70% by weight) 0.5 m$^3$ (9% by weight) of water are introduced into the sprinkling vessel of a UNICAR 2/2 machine (Federal Republic of German) equipped with a UN 15 type wet salt-sprinkler. The road is made free of ice at a rate of 10 g mixture/m$^2$; the sprinkling width amounts to 8 m. The road surface is completely uniformly covered as shown by the light brown colour of the concentrate.

The composition thus obtained is completely suitable for replacing calcium chloride, moreover it is clearly superior to calcium chloride from the point of view of both environmental pollution and corrosion.

EXAMPLE 2

The removal of hoar-frost is carried out by using a sprinkling and water-cart (type NIDO, Netherlands). A 1:2 mixture of undiluted waste concentrate of alcohol distilling industry (dry substance content 70% by weight) and rock-salt is applied onto the road surface. After sprinkling the road surface shows its original black colour and this proves that the composition according to the present invention is perfectly suitable for the replacement of the hitherto used calcium chloride.

EXAMPLE 3

In order to completely replace sodium chloride the following tests are carried out by using a series of dilutions of waste concentrate of alcohol distilling industry.

Waste concentrate of alcohol distilling industry (dilution to 60 and 50% by weight of dry substance, respectively) is applied at an external temperature of $-10°$ C. to a 9 cm thick snow-sheet without any additive. In each case the area of the treated road section is 20.4 m$^2$. The melting effect of the compositions of the present invention is compared to that of the hitherto used known mixture of industrial salt and sand. It has been found that the melting effect of the composition having a dry substance content of 50% by weight is identical with that of the known mixture of salt and sand both in the duration of effect and the strength of activity. The composition of the present invention having a dry substance content of 60% by weight exhibits the melting effect one hour and a half earlier than the known industrial salt-sand mixture. Moreover, the said composition having a dry substance content of 60% by weight is active even at a temperature as low as −13.6° C., while the melting effect of the known mixture of industrial salt and sand slows completely down at −7° C. The costs of the use of the composition according to the invention are only the half of those of the known mixture of industrial salt and sand.

EXAMPLE 4

Water frozen on the surface of bitumen is melted in a clima chamber at a temperature of −5° C. by using the following composition:

| | |
|---|---|
| Waste concentrate having a dry substance content of 70% by weight | 50% by weight |
| Water | 20% by weight |
| Wood-flour (average particle size 1 mm) | 10% by weight |
| Sand (average particle size 1 mm) | 20% by weight |

In the water (20% by weight) 0.2% by weight of a hydrophobizing lauric acid polyglycol ester (HLB value 10.2) is dissolved.

As a result of the treatment the ice layer formed on the surface of bitumen is very rapidly melted.

EXAMPLE 5

One proceeds according to Example 4, with the difference that the following composition is used:

| | |
|---|---|
| Waste concentrate (dry substance content 70% by weight) | 40% by weight |
| Water | 35% by weight |
| River sand (average particle size 1 mm) | 20% by weight |
| Urea | 5% by weight |

The results are similar to those obtained in Example 4.

EXAMPLE 6

The corrosive side-effect of the composition according to the invention is tested on iron plates (size: 100×200×5 mm). The plates are immersed into a 20% by weight sodium chloride solution, on the one hand, and into a water concentrate (dry substance content: 50% by weight) according to the invention, on the other hand. On the surface of the iron plates immersed into the sodium chloride solution a thick rust layer is formed already after three days, while the surface of the iron plates immersed into the waste concentrate according to the invention remained completely unchanged and unaffected even after 14 months.

Quantitative tests are carried out in a salt spray chamber by using a sodium chloride solution having a concentration of 5% by weight. The loss of weight measured after 3 days amounts to 15% by weight, 10% by weight and 0% by weight, respectively, by using a sodium chloride solution, a calcium chloride solution and the waste concentrate according to the invention (dry substance content 50% by weight), respectively. The weight of rust related to one surface unit amounts to 60 g/m², 50 g/m², 40 g/m² and 0 g/m², respectively, when using a 1% by weight sodium chloride solution, a 1% by weight magnesium chloride solution, a 1% by weight calcium chloride solution and the waste concentrate according to the present invention, respectively.

EXAMPLE 7

In order to prove the efficiency of a lower active ingredient concentration a test is carried out by using a waste concentrate having a dry substance content of 240 g/kg at an external temperature of −4° C. The composition is sprayed onto a fresh layer of snow (depth 5 cm) at a rate of 0.6 l/m². The snow layer melts within 12 minutes.

EXAMPLE 8

A series of experiments is carried out in a clima chamber at a temperature of −5° C. in order to test the activity of the composition according to the invention in preventing the adhesion of coal powder (particle size 5–10 mm).

The wall of the storing vessel is sprayed with a mixture of waste concentrate diluted to 60% by weight and admixed with 10% by weight of wood flour (particle size 1 mm) and 1% weight of a hydrophobizing tenside (HLB value 10.2). The composition is added to the coal powder in an amount of 3 g/kg. The composition successfully inhibits the adhesion of the coal powder without decreasing the heating value of the coal.

We claim:

1. An anti-freeze composition for freeing road surfaces of snow and ice which comprises: a mixture of (1) at least one component from the group consisting of sodium chloride, calcium chloride, potassium chloride, magnesium chloride and urea, and (2) an admixture of from 20 to 90% by weight of a waste concentrate of the alcohol distilling industry having a dry-substance content of from 200 to 750 g/kg and from 10 to 80% by weight of water.

2. The composition of claim 1, wherein the waste concentrate is formed using molasses as a raw material.

3. The composition of claim 1, wherein component 1 is sodium chloride.

4. The composition of claim 1, wherein component 1 is calcium chloride.

5. An anti-freeze composition for freeing road surfaces of snow and ice which comprises: a mixture of (1) at least one component from the group consisting of sand, river-gravel, cinders and sawdust, and (2) an admixture of from 20 to 90% by weight of a waste concentrate of the alcohol distilling industry having a dry-substance content of from 200 to 750 g/kg and from 10 to 80% by weight of water.

6. The composition of claim 5, wherein the waste concentrate is formed using molasses as a raw material.

7. An anti-freeze composition for freeing road surfaces of snow and ice which comprises: a mixture of (1) a surfactant having an HLB value of 6 to 12, and (2) an admixture of from 20 to 90% by weight of a waste concentrate of the alcohol distilling industry having a dry-substance content of from 200 to 750 g/kg and from 10 to 80% by weight of water.

8. The composition of claim 7, wherein the waste concentrate is formed using molasses as a raw material.

9. A process for freeing road surfaces of snow and ice which comprises: applying to said surfaces a composition containing from 20 to 90% by weight of a waste concentrate of the alcohol distilling industry having a dry-substance content of 200 to 750 g/kg, in admixture with 10 to 80% by weight of water, the composition being applied at a rate of from 0.05 to 0.4 l/m².

10. The process of claim 9, wherein the composition further contains at least one component from the group consisting of sodium chloride, calcium chloride, potassium chloride, magnesium chloride and urea.

11. The process of claim 9, wherein the composition further contains at least one component from the group consisting of sand, river-gravel, cinders, sawdust and a surfactant having an HLB value of from 6 to 12.

12. The process of claim 9, wherein the composition further contains a surfactant having an HLB value of from 8 to 10.

* * * * *